(12) United States Patent
Watanabe et al.

(10) Patent No.: US 8,480,766 B2
(45) Date of Patent: Jul. 9, 2013

(54) GASIFICATION EQUIPMENT (75) Inventors: Hiroaki Watanabe, Kanagawa (JP); Toshio Abe, Kanagawa (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 400 days.

(21) Appl. No.: 12/530,344

(22) PCT Filed: May 19, 2008

(86) PCT No.: PCT/JP2008/059102
§ 371 (c)(1),
(2), (4) Date: Sep. 8, 2009

(87) PCT Pub. No.: WO2008/146632
PCT Pub. Date: Dec. 4, 2008

(65) Prior Publication Data
US 2010/0104901 A1 Apr. 29, 2010

(30) Foreign Application Priority Data

May 23, 2007 (JP) ................. 2007-136545

(51) Int. Cl.
*B01J 7/00* (2006.01)
*C10J 3/08* (2006.01)
*C01B 3/36* (2006.01)
*C01B 6/24* (2006.01)

(52) U.S. Cl.
USPC .................. 48/61; 48/62 R; 48/77; 48/197 R; 423/644

(58) Field of Classification Search
USPC ........... 48/61, 62 R, 77, 197 R, 210; 423/644
See application file for complete search history.

(56) References Cited

U.S. PATENT DOCUMENTS

| | | | |
|---|---|---|---|
| 3,976,442 A | 8/1976 | Paull et al. | |
| 5,251,433 A * | 10/1993 | Wallace | 60/775 |
| 2004/0131912 A1 * | 7/2004 | Keefer et al. | 429/34 |

FOREIGN PATENT DOCUMENTS

| | | |
|---|---|---|
| JP | 61-114009 | 5/1986 |
| JP | 62-74992 | 4/1987 |
| JP | 09-194854 | 7/1997 |
| JP | 09-228807 | 9/1997 |
| JP | 2000-355693 | 12/2000 |
| JP | 2001-354975 | 12/2001 |
| JP | 2002-275479 | 9/2002 |
| JP | 2006-257351 | 9/2006 |
| JP | 2007-9069 | 1/2007 |
| WO | 00/27951 | 5/2000 |

OTHER PUBLICATIONS

International Search Report—PCT/JP2008/059102—Aug. 8, 2008.
Office Action issued on May 16, 2012 by the Japanese Patent Office in counterpart Japanese Patent Application No. 2007-136545, 2 pages.

* cited by examiner

*Primary Examiner* — Matthew Merkling
(74) *Attorney, Agent, or Firm* — Young & Thompson (57) ABSTRACT

Gasification equipment with a gasification furnace which maintains a. high cold gas efficiency, and suppresses a temperature rise of the gasification gas to minimize ash deposition is disclosed. A part of a $CO_2$ gas separated from an exhaust of a power generation plant is compressed by a. recovered $CO_2$ compressor 25. The compressed $CO_2$ gas is used for transport of coal (pulverized coal). The $CO_2$ gas is supplied, together with the pulverized coal, into a gasification furnace to accelerate the formation of CO by an endothermic reaction between C and $CO_2$ and suppress a temperature raise within a coal gasification furnace 15, thereby producing a gasification gas.

5 Claims, 3 Drawing Sheets

| | Unit | $N_2$ transport | $CO_2$ transport |
|---|---|---|---|
| Pressure | MPa | 26.5 | 26.5 |
| Oxygen ratio | – | 0.387 | 0.387 |
| Coal charge | t/h | 118.5 | 118.5 |
| Gasifying agent flow rate | t/h | 111.7 | 111.7 |
| Gasifying agent $O_2$ content | vol% | 95 | 95 |
| Carrier gas flow rate | t/h | 31.3 | 31.3 |
| Carrier gas $N_2$ content | vol% | 99.78 | 0 |
| Carrier gas $CO_2$ content | vol% | 0 | 100 |
| Quenching gas flow rate | t/h | 24.5 | 24.5 |
| Nature of quenching gas | – | Resulting gas | 100%$CO_2$ |

FIG.4

| | Unit | $N_2$ transport | $CO_2$ transport |
|---|---|---|---|
| In-furnace carbon conversion rate | % | 70 | 100 |
| Amount of resulting char | t/h | 51.8 | 13.9 |
| C content in char | wt% | 72.9 | 0 |
| Ash content in char | wt% | 27.1 | 100 |
| Flow rate of resulting gas | t/h | 274.6 | 274.6 |
| Calorific value of resulting gas (HHV-wet) | MJ/m³N | 10.31 | 11.13 |
| Composition of resulting gas | | | |
| $CH_4$ | vol% | 0 | 0 |
| $H_2$ | vol% | 24.4 | 21.3 |
| CO | vol% | 56.9 | 66.5 |
| $CO_2$ | vol% | 0 | 5.4 |
| $H_2O$ | vol% | 0 | 5.3 |

GASIFICATION EQUIPMENT

TECHNICAL FIELD

This invention relates to gasification equipment provided with a gasification furnace which produces a gasification gas by a reaction between a carbonaceous fuel and $O_2$.

BACKGROUND ART

Coal exists in a wide area of the world. Its minable coal reserve is large, and its price is stable. Thus, the stability of its supply is high, and its price per unit calorific value is low. For this reason, coal-fired thermal power generation plays an important role in ensuring energy and stabilizing energy prices. The coal-fired thermal power generation is also important in its role as an adjuster for the balance between a demand for power by the coal-fired thermal power generation and a demand for power by hydroelectric power generation or nuclear power generation.

Known examples of thermal power generation using coal as a fuel are steam power generation which burns coal in a boiler to obtain steam, thereby driving a steam turbine, and gas turbine power generation which purifies a coal gasification gas, burns the purified gas by a combustor, and expands a combustion gas from the combustor in an expansion turbine (gas turbine) to obtain power by the gas turbine. Combined cycle power generation, for example, is also known in which a steam turbine driven by steam obtained by heat recovery of an exhaust gas from a gas turbine is provided in addition to gas turbine power generation.

As a coal gasification furnace, a fixed bed gasifier, a fluidized bed gasifier, and an entrained bed or flow gasifier are known. As the coal gasification furnace for a power generation plant, an entrained bed type or entrained flow type coal gasification furnace, which melts ash of coal and discharges the molten ash as slag, is mainly developed.

With the entrained flow coal gasification furnace, coal from a burner and an oxidizing agent react within the furnace to reach a high temperature, whereby ash in the coal is melted, and slag-shaped ash is separated. During this process, a gasification reaction proceeds to produce a combustible gasification gas. Part of the molten and slaggy ash may be borne by the gasification gas, and deposited on the inner wall or the like of the furnace. Thus, it has been common practice to supply a quenching gas, which has a temperature lower than the temperature of the gasification gas, to the neighborhood of the outlet of the furnace, thereby lowering the temperature of the gasification gas in order to prevent the deposition of the ash (see, for example, Patent Document 1). As the quenching gas, a part of the resulting gasification gas, for example, is cooled and supplied.

When a part of the gasification gas is used as the quenching gas, it has been necessary to construct a branched path for the gasification gas separated from the slag or the like by a cyclone or the like, and further provide an instrument, such as a heat exchanger, for cooling the gasification gas, or a flow controller for controlling the flow of the gasification gas. Thus, the instruments around the outlet of the gasification furnace have become complicated, the cost of equipment has mounted, and restrictions have been imposed on the design of the shape of the gasification furnace. To keep the efficiency (cold gas efficiency) of the gasification furnace high, it is crucial to maintain the calorific value of the resulting gas at a high level. At the same time, it is also necessary to consider suppressing the deposition of ash.

Thus, it is currently a difficult situation to prevent the deposition of ash, and at the same time, maintain the calorific value of the resulting gas at a high level, while imparting a degree of freedom to the design of the gasification furnace, without changing the design of the gasification furnace.

Patent Document 1: JP-A-9-194854

DISCLOSURE OF THE INVENTION

Problems to be Solved by the Invention

The present invention has been accomplished in the light of the above-described situations. It is an object of the invention to provide gasification equipment equipped with a gasification furnace which ensures the calorific value, per unit flow rate, of the resulting gas relative to the calorific value, per unit flow rate, of a carbonaceous fuel to maintain a high efficiency, and involves minimal deposition of ash.

Means for Solving the Problems

The gasification equipment of the present invention, intended for attaining the above object, is characterized by having $CO_2$ charging means for charging $CO_2$ from the outside into a gasification furnace for producing a gasification gas by a reaction between a carbonaceous fuel and $O_2$.

The present invention provides the gasification equipment equipped with a gasification furnace which charges $CO_2$ from the $CO_2$ charging means to accelerate the formation of CO by an endothermic reaction between C and $CO_2$ and suppress a temperature rise within the gasification furnace, thereby producing a gasification gas, ensures the calorific value, per unit flow rate, of the resulting gas relative to the calorific value, per unit flow rate, of a carbonaceous fuel to maintain a high efficiency, and involves minimal deposition of ash while suppressing the temperature rise of the gasification gas.

The gasification equipment of the present invention is the gasification equipment, characterized in that the $CO_2$ charging means is a fuel transport means for transporting the carbonaceous fuel into the gasification furnace, and charges $CO_2$ into the gasification furnace together with the transported carbonaceous fuel, thereby accelerating the endothermic reaction for producing the gasification gas.

In the present invention, $CO_2$ can be charged into the gasification furnace, together with the carbonaceous fuel, by the fuel transport means. By so replacing a carrier gas by $CO_2$ with the use of existing equipment, $CO_2$ can be charged easily.

The gasification equipment of the present invention is the gasification equipment, characterized in that the $CO_2$ charging means is a cooling means for charging $CO_2$ for cooling.

In the present invention, the temperature rise of the gasification gas can be suppressed by the sensible heat of $CO_2$, and the endothermic reaction for production of the gasification gas can be accelerated by $CO_2$ used for cooling.

The gasification equipment of the present invention is the gasification equipment, characterized in that the $CO_2$ charging means is a fuel transport means for transporting the carbonaceous fuel into the gasification furnace, and a cooling means for charging $CO_2$ for cooling, and $CO_2$ is charged into the gasification furnace together with the carbonaceous fuel transported by the fuel transport means, whereby the endothermic reaction for producing the gasification gas is accelerated.

In the present invention, $CO_2$ can be charged into the gasification furnace, together with the carbonaceous fuel, by the fuel transport means. Since a carrier gas is replaced by $CO_2$ with the use of existing equipment, $CO_2$ can be charged easily. Moreover, the temperature rise of the gasification gas can be suppressed by the sensible heat of $CO_2$, and the endothermic reaction for production of the gasification gas can be accelerated by $CO_2$ used for cooling.

The gasification equipment of the present invention is the gasification equipment, characterized in that the gasification furnace is an entrained flow coal gasification furnace which produces a coal gasification gas by a reaction between coal and $CO_2$.

The present invention provides gasification equipment equipped with an entrained flow coal gasification furnace which ensures the calorific value, per unit flow rate, of the resulting gas relative to the calorific value, per unit flow rate, of coal to maintain a high efficiency, and involves minimal deposition of ash while suppressing the temperature rise of the gasification gas.

The gasification equipment of the present invention is the gasification equipment, characterized in that $CO_2$ charged by the $CO_2$ charging means is $CO_2$ recovered from a power generation plant equipped with a molten carbonate fuel cell from which $CO_2$ is recovered as an exhaust gas.

The present invention provides gasification equipment equipped with a gasification furnace which enables $CO_2$ as an exhaust gas of the molten carbonate fuel cell to be recovered effectively.

The gasification equipment of the present invention is the gasification equipment, characterized in that $CO_2$ charged by the $CO_2$ charging means is $CO_2$ recovered from gas turbine power generation equipment in which $CO_2$ is operated as an exhaust gas in a closed cycle.

The present invention provides gasification equipment equipped with a gasification furnace in which $CO_2$ recovered from the gas turbine power generation equipment operated in the closed cycle can be recovered effectively.

Effects of the Invention

The gasification equipment of the present invention is provided as gasification equipment which ensures the calorific value, per unit flow rate, of the resulting gas relative to the calorific value, per unit flow rate, of a carbonaceous fuel to maintain a high efficiency, and involves minimal deposition of ash.

DESCRIPTION OF THE NUMERALS

2 Molten carbonate fuel cell (MCFC)
3 Combustor
4 Turbine
5 Power generator
7 Fuel electrode (anode)
8 Air electrode (cathode)
9 Waste heat boiler
11 Steam generator
12 Condenser
13 $CO_2$ compressor
14 Oxygen production unit
15 Coal gasification furnace
16 Gas cooler
17 Porous filter
18 Desulfurizer
19 Shift reactor
21 Pump
25 Recovered $CO_2$ compressor
26 Hopper
31 Cooler
32 Blower
41 Steam power generation equipment
42 Cyclone

BEST MODE FOR CARRYING OUT THE INVENTION

Gasification equipment according to an embodiment of the present invention is provided with a gasification furnace into which $O_2$ is blown to burn coal, thereby producing a gasification gas. The gasification gas obtained by the gasification furnace is used as an anode gas for a molten carbonate fuel cell (MCFC). A cathode gas of the MCFC contains pure $O_2$ and a $CO_2$ gas, and an exhaust gas ($CO_2$ gas) from the MCFC is expanded in an expansion turbine to generate electricity. An exhaust gas from the expansion turbine is subjected to heat recovery to generate electricity by a steam turbine. A portion of the $CO_2$ gas is compressed by a $CO_2$ compressor, and circulated together with pure $O_2$ as a cathode gas. Another portion of the $CO_2$ gas is compressed by a recovered $CO_2$ compressor, and the compressed $CO_2$ gas is used for transport of coal (pulverized coal). The $CO_2$ gas together with the pulverized coal is supplied into the gasification furnace ($CO_2$ charging means). Furthermore, the compressed $CO_2$ gas is charged, as a quenching gas, into the gasification furnace ($CO_2$ charging means).

Thus, there is provided gasification equipment equipped with the gasification furnace in which $CO_2$ is supplied into the gasification furnace to accelerate the formation of CO by an endothermic reaction between C and $CO_2$ and suppress a temperature rise within the gasification furnace, thereby producing a gasification gas; the calorific value, per unit flow rate, of the resulting gas relative to the calorific value, per unit flow rate, of a carbonaceous fuel, is ensured to maintain a high cold gas efficiency and minimize the deposition of ash while suppressing the temperature rise of the gasification gas.

Figure 1:
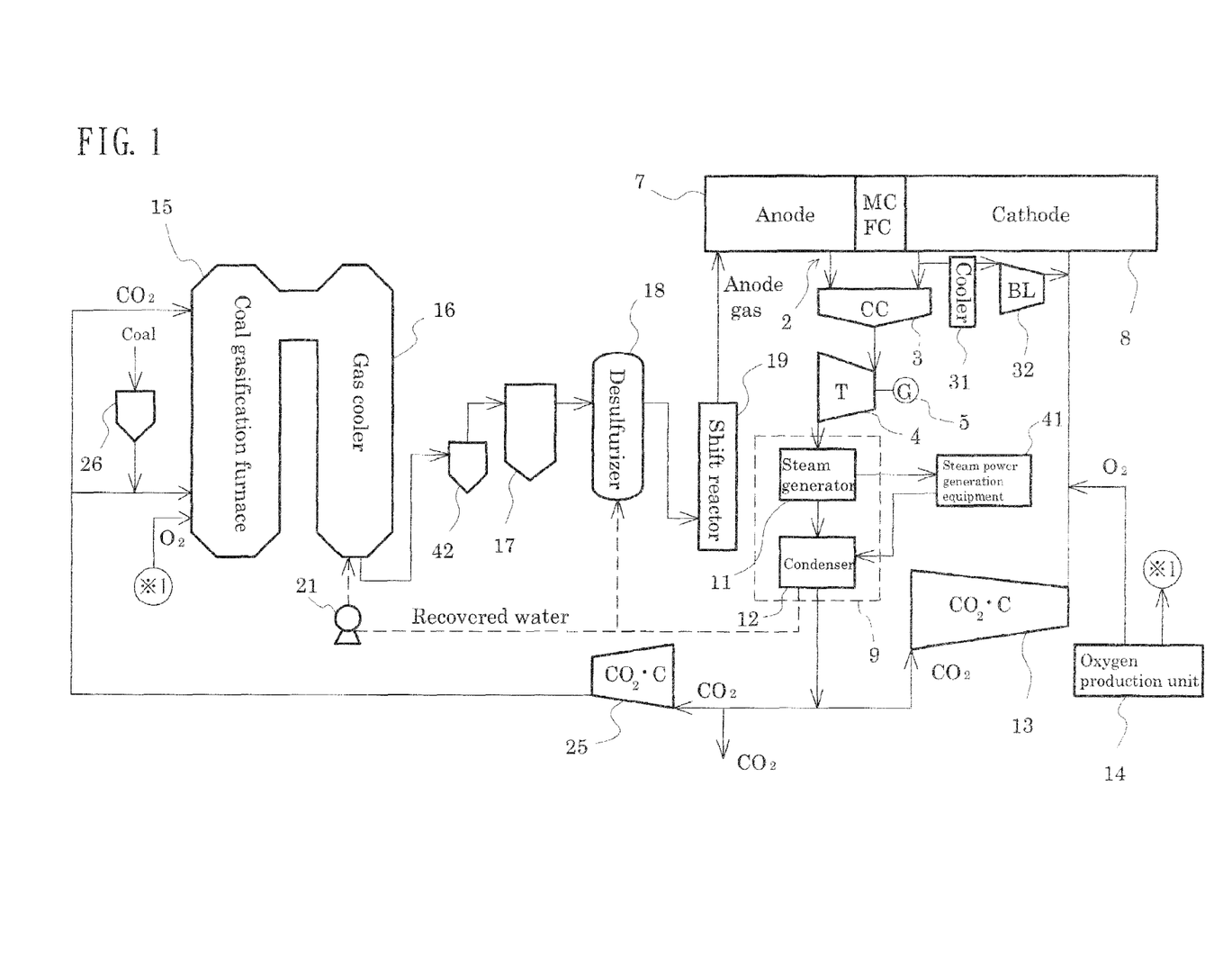
FIG. 1 is a schematic system diagram of a power generation plant equipped with gasification equipment according to an embodiment of the present invention.
Figure 2:
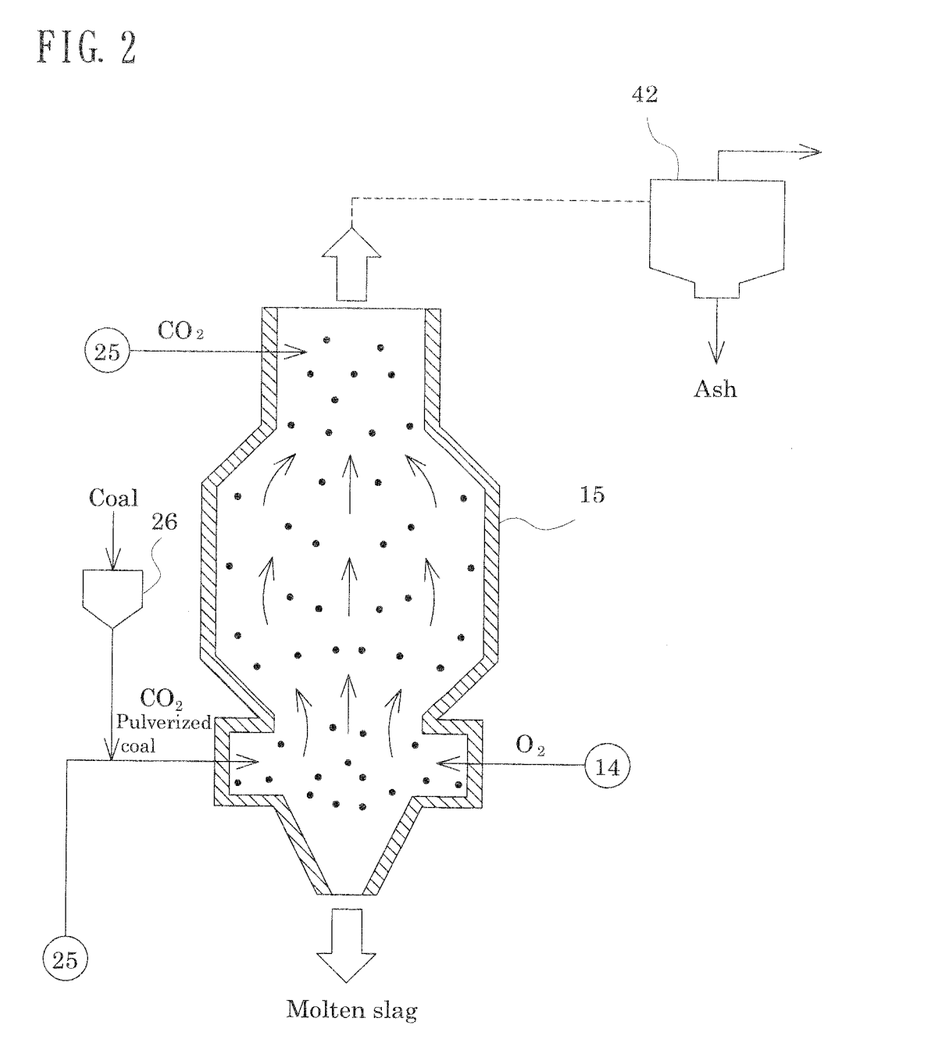
FIG. 2 is a detail configurational drawing of a coal gasification furnace.

A power generation plant equipped with gasification equipment according to an embodiment of the present invention will now be described concretely based on FIG. 1. FIG. 1 shows the schematic system of the power generation plant equipped with gasification equipment according to the embodiment of the present invention. FIG. 2 shows the detailed configuration of a coal gasification furnace.

As shown in FIG. 1, the power generation plant is equipped with a molten carbonate fuel cell (MCFC) 2, and is provided with a combustor 3 into which an outlet gas (exhaust gas) of the MCFC 2 is introduced for combustion. A turbine 4 driven upon expansion of a combustion gas from the combustor 3 is provided, and a power generator 5 is provided coaxially on the turbine 4. The driving of the turbine 4 actuates the power generator 5 to carryout power generation.

The MCFC 2 is constructed by interposing an electrolyte (carbonate) between a fuel electrode (anode) 7 formed from a nickel porous material, for example, and an air electrode (cathode) 8 formed from a nickel oxide porous material, for example. Hydrogen ($H_2$) obtained from a coal gasification gas is supplied to the anode 7, and air ($O_2$) and $CO_2$ are supplied to the cathode 8, whereby power generation is performed by an electrochemical reaction between $H_2$ and $O_2$.

A waste heat recovery means (waste heat boiler) 9 for performing heat recovery of an exhaust (exhaust gas) after finishing work in the turbine 4 is provided downstream of the turbine 4. The waste heat boiler 9 is equipped with a steam generator 11 and a condenser 12. To the condenser 12 of the waste heat boiler 9, feed water from steam power generation equipment 41, for example, condensate formed by condensation of steam having finished work in a steam turbine, is fed as a cooling medium (for feed water heating). The exhaust gas, which has been subjected to heat recovery in the steam generator 11, is condensed by the condenser 12 to be separated into water ($H_2O$) and a non-condensable gas ($CO_2$). Steam generated by the steam generator 11 is fed to the steam power generation equipment 41 to drive the steam turbine, thereby obtaining power.

Part of $CO_2$ separated by the condenser 12 is compressed by a $CO_2$ compressor 13, and an oxygen production unit 14 is provided as an oxygen supply system for supplying pure $O_2$ at a predetermined pressure to the $CO_2$ compressed by the $CO_2$ compressor 13. The pure $O_2$ at the predetermined pressure is supplied to the $CO_2$ compressed by the $CO_2$ compressor 13 to generate a cathode gas, and the cathode gas is supplied to the cathode 8 of the MCFC 2.

The oxygen production unit 14 is a means for pressurizing pure $O_2$ from deep-freezing equipment at a predetermined pressure and supplying it. By supplying a desired amount of $O_2$ from the oxygen production unit 14, a power generation plant having the MCFC 2 capable of operating at a desired ratio of $O_2$ to $CO_2$ becomes feasible.

On the other hand, a coal gasification furnace 15 ($O_2$-blown gasification furnace) for obtaining a coal gasification gas (a hydrocarbon-based gasification gas) by combusting coal together with pure $O_2$ obtained by the oxygen production unit 14 is provided. The coal gasification gas obtained by the coal gasification furnace 15 is cooled by a gas cooler 16, and fed to a cyclone 42, where it is turned into a coal gasification gas having ash separated therefrom.

The ash-separated coal gasification gas is passed through a porous filter 17, and desulfurized by a desulfurizer 18. The coal gasification gas desulfurized by the desulfurizer 18 is subjected to a chemical reaction (exothermic reaction) in a shift reactor 19 to be converted into $H_2$ and $CO_2$. A desired anode gas obtained in this manner is supplied to the anode 7 of the MCFC 2. If foreign matter remains in the coal gasification gas after desulfurization, the foreign matter can be trapped by the shift reactor 19. The shift reactor 19 has a desired catalyst disposed within piping through which the coal gasification gas flows. In the shift reactor 19, the coal gasification gas (CO-containing gas) is converted into $H_2$ and $CO_2$ by the exothermic reaction to form the anode gas containing $H_2$ for use in an electrochemical reaction. That is, in the shift reactor 19, the exothermic reaction $$CO+H_2O \rightarrow H_2+CO_2$$

is carried out.

Since $H_2$ is obtained by the exothermic reaction, the anode gas containing $H_2$ can be supplied to the anode 7 of the MCFC 2, without using a heat exchanger (gas/gas heat exchanger) for raising the temperature of the anode gas to a desired temperature, that is, without requiring heat from other instruments. Thus, the temperature of the anode gas can be maintained at the desired temperature by maintaining the calorific value. Accordingly, the anode gas can be obtained in the absence of an extra heat source for heat exchange or a cooling source (circulation of the anode exhaust gas, etc.) for adjusting the temperature of the anode gas, and in a state where no radiant heat occurs.

Furthermore, heat generation by the shift reaction, which has so far occurred within the MCFC 2, is performed outside the MCFC 2. Thus, cooling of the MCFC 2 is not needed by an amount corresponding to the heat generation due to the shift reaction. As a result, cooling power of the cell by the cathode gas is cut down.

The desulfurizer 18 is a wet type device, and accepts part of the condensate (recovered water) condensed by the condenser 12 of the aforementioned waste heat boiler 9. The condensate (recovered water) condensed by the condenser 12 is fed to the gas cooler 16 by a pump 21, and used as a medium for cooling the coal gasification gas. The condensate (recovered water) is heated by heat exchange in the gas cooler 16 to be turned into steam, which is supplied to the coal gasification gas desulfurized by the desulfurizer 18.

A cooler 31 is provided for cooling a part of the cathode exhaust from the MCFC 2 which is fed to the combustor 3. The cathode exhaust cooled by the cooler 31 is supplied to the cathode gas on the inlet side of the cathode 8 (i.e., cathode gas containing pure $O_2$ and $CO_2$ gas) by a blower 32 as a heating-up means, whereby the cathode gas is heated to a desired temperature. It is also possible to provide an ejector instead of the blower 32. Thus, the cathode gas can be supplied to the cathode 8 of the MCFC 2, without the need to use a heat exchanger (gas/gas heat exchanger) for heating the cathode gas to the desired temperature.

The gasification equipment will be described based on FIGS. 1 and 2.

As shown in FIGS. 1 and 2, of the $CO_2$ separated by the condenser 12 of the waste heat boiler 9, a surplus portion is recovered to the outside, while a part of, the surplus $CO_2$ is compressed by a recovered $CO_2$ compressor 25, and fed to the coal gasification furnace 15 as a compressed $CO_2$ gas for coal transport. Pulverized coal from a hopper 26 is transported by the compressed $CO_2$ gas, and supplied, together with the $CO_2$ gas, to the coal gasification furnace 15 ($CO_2$ transport means: $CO_2$ charging means). Further, the coal gasification furnace 15 is supplied with pure $O_2$ from the oxygen production unit 14 (see ).

In the coal gasification furnace 15, a gasification gas is produced by the reaction between the pulverized coal and $O_2$ in the presence of $CO_2$. A part of the compressed $CO_2$ for coal transport, which has been compressed by the recovered $CO_2$ compressor 25, is charged as a quenching gas into the neighborhood of the outlet of the coal gasification furnace 15 (cooling means: $CO_2$ charging means) to lower the temperature of the resulting gas, thereby preventing deposition of ash.

With the coal gasification furnace 15, the gasification gas is produced by the reaction between the pulverized coal and $O_2$ in the presence of $CO_2$. Thus, a gasification reaction, namely, an endothermic reaction as a CO formation reaction between C and $CO_2$, can be accelerated, and the calorific value of the resulting gas relative to the calorific value of the fuel can be maintained high, without a rise in the temperature of the resulting gas.

The pulverized coal is transported by the $CO_2$ gas, and supplied together with the $CO_2$ gas, so that spontaneous ignition of the pulverized coal or back fire can be prevented as in the case of transport by $N_2$. That is, pulverized coal is generally transported by $N_2$ in order to prevent the ignition phenomenon of the pulverized coal. However, $CO_2$ also fails to contribute to an oxidation reaction associated with heat generation. Thus, the transport of the pulverized coal by the $CO_2$ gas can also perform the function of preventing spontaneous ignition or back fire, as by the use of $N_2$.

Hence, the calorific value, per unit flow rate, of the resulting gas relative to the calorific value, per unit flow rate, of the fuel can be ensured, and the efficiency (cold gas efficiency) of the coal gasification furnace 15 can be maintained at a high level. At the same time, a rise in the temperature of the gasification gas can be suppressed to suppress the deposition of ash in the neighborhood of the outlet of the coal gasification furnace 15. For this reason, it is also possible to omit a means for charging a part of the compressed $CO_2$ for coal transport, which has been compressed by the recovered $CO_2$ compressor 25, as a quenching gas into the neighborhood of the outlet of the coal gasification furnace 15.

Furthermore, the gasification reaction is accelerated by the reaction between the pulverized coal and $O_2$ in the presence of $CO_2$. Thus, unburned carbon (char) can be eliminated, and a system for separating char by the cyclone 42 and charging it again (a hopper or the like) can be omitted. For example, the in-furnace carbon conversion ratio of the coal gasification furnace 15 can be increased from a value of the order of 70% to 100%. Thus, the cyclone 42 can be of a simple configuration only having the function of discharging the ash.

With the power generation plant equipped with the above-described gasification equipment, coal (pulverized coal) is transported to the coal gasification furnace 15 by $CO_2$ compressed by the recovered $CO_2$ compressor 25. The transported coal (pulverized coal) is burned in the coal gasification furnace 15 together with $O_2$ in the presence of $CO_2$ to produce the coal gasification gas (CO-containing gas). A part of $CO_2$ compressed by the recovered $CO_2$ compressor 25 is charged as a quenching gas into the neighborhood of the outlet of the coal gasification furnace 15 to lower the temperature of the resulting coal gasification gas, thereby preventing the deposition of ash on the surface of the furnace wall.

The coal gasification gas produced in the coal gasification furnace 15 is cooled in the gas cooler 16, then deashed in the cyclone 42, passed through the porous filter 17, and desulfurized by the desulfurizer 18 to form the CO-containing gas as the anode gas. The CO-containing gas is converted into $H_2$ and $CO_2$ by the exothermic reaction in the shift reactor 19, and the anode gas containing $H_2$ is supplied to the anode 7 of the MCFC 2. In the MCFC 2, power generation is performed by the electrochemical reaction between the anode gas containing $H_2$ and the cathode gas containing pure $O_2$ and $CO_2$ gas.

Thus, the desired anode gas can be obtained from the coal gasification gas in the absence of an extra heat source and a heat exchange source.

The exhaust from the MCFC 2 is burned by the combustor 3, and expanded by the turbine 4 so that power generation is performed by the power generator 5. The exhaust from the turbine 4 is subjected to heat recovery by the steam generator 11 of the waste heat boiler 9, and cooled by the condenser 12 to be separated into a $CO_2$ gas and water. The separated $CO_2$ gas is compressed by the $CO_2$ compressor 13, and pressure-fed as the cathode gas, together with pure $O_2$ from the oxygen production unit 14, to the cathode 8. The exhaust from the cathode 8 is cooled by the cooler 31, and supplied in circulation to the cathode gas on the inlet side by the blower 32, whereby the cathode gas is maintained at the desired temperature.

In generating the CO-containing gas as the anode gas, water separated by the condenser 12 of the waste heat boiler 9 (i.e., recovered water) is fed to the gas cooler 16 by the pump 21 to cool the coal gasification gas.

On the other hand, a part of $CO_2$ separated by the condenser 12 is compressed to a predetermined pressure by the recovered $CO_2$ compressor 25. The pulverized coal from the hopper 26 is transported by the compressed $CO_2$ to the coal gasification furnace 15. A part of $CO_2$ compressed by the recovered $CO_2$ compressor 25 is charged as a quenching gas into the neighborhood of the outlet of the coal gasification furnace 15 to lower the temperature of the resulting coal gasification gas. By so doing, even if a part of ash which has melted and become slaggy is conveyed by the gasification gas, the slaggy ash does not become so hot as to be deposited on the wall surface inside the furnace.

The pulverized coal is transported to the coal gasification furnace 15 by the compressed $CO_2$, and $CO_2$ is formed by the reaction between the pulverized coal and $O_2$ to produce CO. The reaction at this time occurs in the presence of $CO_2$ upon supply of $CO_2$ for coal transport, so that the reaction is accelerated to produce a gasification gas. That is, the resulting $CO_2$ is supplemented by $CO_2$ from the outside, whereby the reaction is accelerated to produce the gasification gas. The reaction within the furnace on this occasion is as follows:

$$C+O_2 \rightarrow CO_2 Q \text{ (Kcal/mol)}: \quad \text{exothermic reaction}$$

$$C+CO_2 \rightarrow 2CO-Q \text{ (Kcal/mol)}: \quad \text{endothermic reaction}$$

Because of heat balance within the furnace, $CO_2$ in the exothermic reaction is formed by the reaction in an amount enough to burn Q(−) in the endothermic reaction. $CO_2$ is supplied, as a gas for transport of coal, to the interior of the coal gasification furnace 15 from the outside. As a result, $CO_2$ in the endothermic reaction increases to increase Q(−), thereby lowering the temperature within the furnace and accelerating the reaction. The acceleration of the reaction by $CO_2$ is achieved by the acceleration of the reaction by $CO_2$ supplied by transport of the pulverized coal and the acceleration of the reaction by $CO_2$ supplied as a quenching gas.

Since the reaction is accelerated, even the pulverized coal with low reactivity is completely burned, and the unburned carbon (char) can be eliminated. Thus, a system for separating char by the cyclone 42 and charging it into the furnace again can be omitted. That is, it becomes possible to omit a hopper for storing char, piping for returning char, and adjusting means for maintaining the pressure in a predetermined state.

Moreover, the calorific value (×flow rate) of the resulting gas relative to the calorific value (×flow rate) of fuel can be maintained at a high level, without the need to change the flow rate of fuel. Thus, the cold gas efficiency can be increased. Consequently, the efficiency can be increased in comparison with the existing gasification furnace. Furthermore, the gasification furnace of a simple structure can be designed, with the efficiency being maintained.

Besides, $CO_2$ does not contribute to an oxidation reaction accompanied by heat generation. Thus, even when the pulverized coal is supplied to the coal gasification furnace 15 together with the $CO_2$ gas, spontaneous ignition or back fire can be prevented, and transport by $CO_2$ can be applied as an alternative to transport by $N_2$.

As a result, it becomes possible to keep down the initial cost of the gasification furnace, and the degree of freedom in designing the gasification furnace using a carbonaceous fuel even if other than coal is markedly heightened. For example, the gasification furnace using pulverized coal with low reactivity as a fuel can be of a simple configuration which obviates the necessity for considering the recovery of char. With the gasification furnace using a fuel with high reactivity, the design of the furnace itself (the length of the path, a pressure vessel, a container for cooling, etc.) can be simplified in order to obtain the desired efficiency.

A comparison with the transport of the pulverized coal by $N_2$ in the above-mentioned gasification equipment will be explained.

In making the comparison, a gasification furnace of a one-chamber, one-stage entrained bed type having a furnace diameter of 4.0 m, a furnace length of 8.0 m, and a length of the site, where the quenching gas is charged, of 1.0 m was used as the gasification furnace. The pulverized coal used had an inherent moisture content (air dried basis) of 3.6 wt. %, an ash content (air dried basis) of 9.6 wt. %, a volatile content of 30.3 wt. %, C content (dry basis) of 76.3 wt. %, H content (dry basis) of 5.1 wt. %, O content (dry basis) of 6.9 wt. %, N content (dry basis) of 1.7 wt. %, and S content (dry basis) of 0.5 wt. %.

Figure 3:
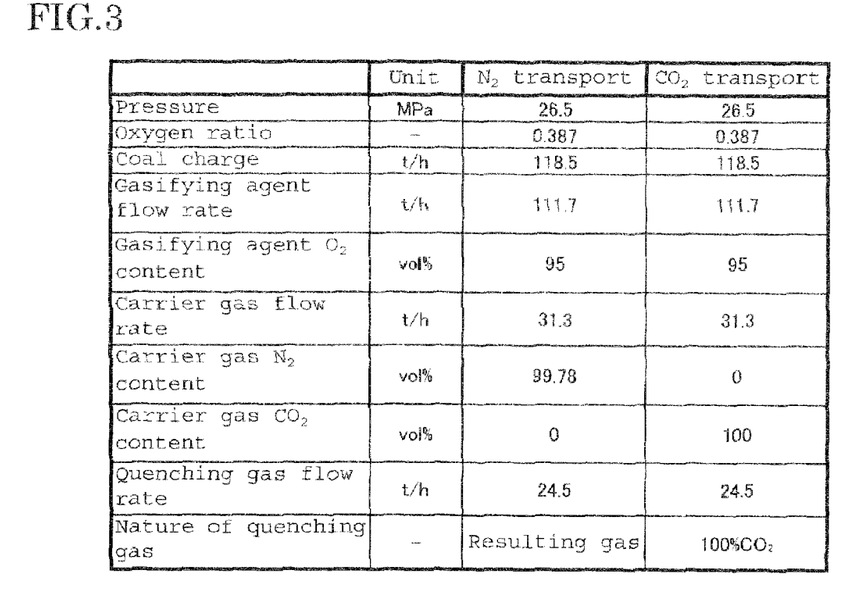
FIG. 3 is a tubular drawing showing gasification conditions.

As shown in FIG. 3, the gasification conditions were, in the case of $N_2$ transport, a pressure of 26.5 MPa, an oxygen ratio of 0.387, a coal charge of 118.5 t/h, a gasifying agent flow rate of 111.7 t/h, a gasifying agent $O_2$ content of 95 vol. %, a carrier gas flow rate of 31.3 t/h, a carrier gas $N_2$ content of 99.78 vol. %, a quenching gas flow rate of 24.5 t/h, and the nature of the quenching gas being the resulting gas. In the case of $CO_2$ transport, the carrier gas $CO_2$ content was 100 vol. % instead of the carrier gas $N_2$ content of 99.78 vol. % in the $N_2$ transport, the nature of the quenching gas was 100% $CO_2$ instead of the nature of the quenching gas being the resulting gas in the $N_2$ transport, and the other gasification conditions were the same as those in the $N_2$ transport.

Figure 4:
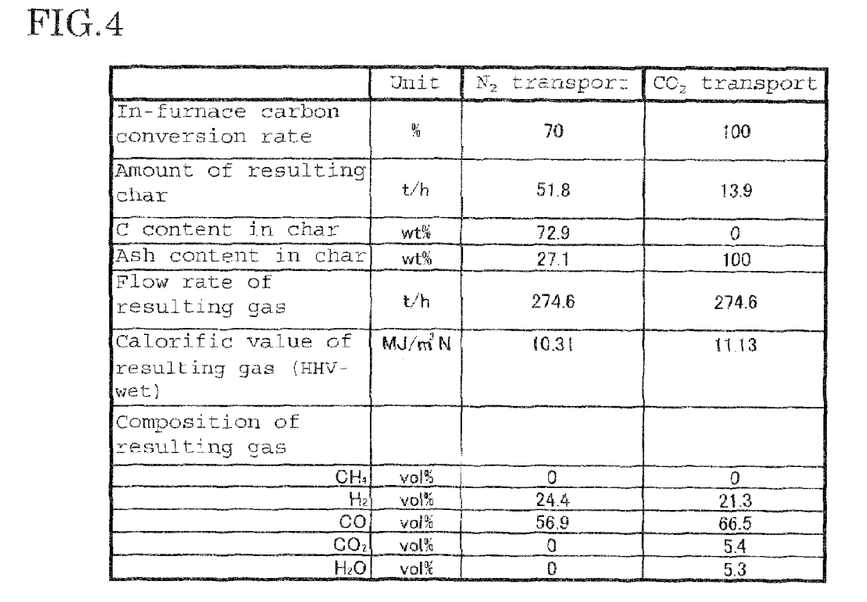
FIG. 4 is a tubular drawing showing the status of the resulting gas.

The status of the resulting gas in the transport of coal by $N_2$ and in the transport of coal by $CO_2$ under the above-mentioned conditions will be described based on FIG. 4.

The in-furnace carbon conversion rate was 70% in the $N_2$ transport, and 100% in the $CO_2$ transport. When coal was transported by $CO_2$, the carbon within the furnace was converted 100% into a fuel gas because of the acceleration of the reaction by $CO_2$. That is, in the case of $N_2$ transport, the amount of the resulting char was 51.8 t/h, the C content in the char was 72.9 wt. %, and the ash content in the char was 27.1 wt. %. In the case of $CO_2$ transport, the amount of the resulting char was 13.9 t/h, the C content in the char was 0 wt. %, and the ash content in the char was 100 wt. %. As a result of the acceleration of the reaction by $CO_2$, therefore, $CO_2$ transport of coal is found to be capable of eliminating unburned C.

The flow rate of the resulting gas was 274.6 t/h for both of $N_2$ transport and $CO_2$ transport. In the case of $N_2$ transport, the calorific value of the resulting gas (HHV-wet) was 10.31 $MJ/m^3N$, and the composition of the resulting gas was $H_2$ 24.4 vol. % and CO 56.9 vol. %. In the case of $CO_2$ transport, the calorific value of the resulting gas (HHV-wet) was 11.13 $MJ/m^3N$, and the composition of the resulting gas was $H_2$ 21.3 vol. %, CO 66.5 vol. %, $CO_2$ 5.4 vol. %, and $H_2O$ 5.3 vol. %. The content of $CH_4$ was 0 vol. % for both of $N_2$ transport and $CO_2$ transport.

When coal is transported by $CO_2$, the reaction is accelerated by $CO_2$, with the result that CO, a fuel component in the resulting gas, increases, and the calorific value of the resulting gas (HHV-wet) can be maintained at a high level. As a result, the cold gas efficiency (the calorific value of the resulting gas multiplied by the gas flow rate/the calorific value (cal) of coal multiplied by the gas flow rate) is 78.8% in $N_2$ transport, while it is increased to 80.8% in $CO_2$ transport.

Thus, coal is transported by $CO_2$, and $CO_2$ is charged into the furnace, whereby $CO_2$ in the endothermic reaction for forming CO upon reaction with C can be increased. As a result, it is seen that the reaction within the furnace is accelerated, C within the furnace is converted 100% into the fuel gas, and the unburned C can be eliminated. Moreover, $CO_2$ in the endothermic reaction increases to lower the temperature within the furnace. Even in the presence of a minimum amount of the quenching gas (even in the absence of the quenching gas), it is seen that the slaggy ash does not become too hot, and there is no deposition of ash on the wall surface within the furnace. Thus, it becomes possible to achieve both of the prevention of ash deposition and the high calorific value of the resulting gas.

The gasification furnace provided in the above-described gasification equipment is a gasification furnace which ensures the calorific value, per unit flow rate, of the resulting gas relative to the calorific value, per unit flow rate, of the coal (pulverized coal) to maintain the efficiency at a high level and which involves minimal deposition of ash.

In the above-described embodiment, coal is taken as an example to illustrate the carbonaceous fuel. However, biomass can be applied as a solid fuel. Also, a low quality heavy oil such as oil sand or Orinoco tar, petroleum coke discharged from a petroleum refining plant, or an ultra-low quality heavy oil such as asphalt can be applied as the carbonaceous fuel. In this case, light oil, a gasoline alternative oil, or an alcohol such as methanol can be obtained.

$CO_2$ for transport of coal is used as the means for charging $CO_2$ into the gasification furnace. However, $N_2$ may be used to transport coal, and a system for charging $CO_2$ can be provided separately. By providing the independent system for charging $CO_2$, an optimal flow rate of $CO_2$ can be charged, regardless of the status of transport of the pulverized coal, and the acceleration of the reaction can be controlled meticulously. Furthermore, the example of charging $CO_2$ as a quenching gas has been taken for illustration, but the resulting gas can be used as the quenching gas. In this case, $CO_2$ can be charged into the gasification furnace, without a great change in the existing equipment. Since $CO_2$ is charged to accelerate the endothermic reaction, moreover, the gasification furnace can be constructed, with the charging of the quenching gas being omitted. Besides, it is possible to construct the $CO_2$ charging means for charging $CO_2$ from the outside by introducing $CO_2$ as the quenching gas.

In the above-mentioned embodiment, the example of charging $CO_2$ recovered from the power generation plant equipped with the MCFC 2 is shown. However, there may be equipment charged with $CO_2$ recovered from gas turbine power generation equipment in which $CO_2$ is operated as an exhaust gas in a closed cycle.

That is, the present invention can be applied to a closed-cycle power generation plant in which the gasification gas (after desulfurization) from the coal gasification furnace 15 (see FIG. 1) of the present embodiment, pure $O_2$, and $CO_2$ compressed by the compressor are fed to a combustor, a gas turbine is provided for expanding a combustion gas from the combustor to generate electricity, and an exhaust from the gas turbine (i.e., $CO_2 \cdot H_2O$) is subjected to heat recovery and recovered into the compressor. A part of the exhaust gas from the gas turbine is compressed by the recovered $CO_2$ compressor 25 (see FIG. 1), and used for coal transport. In this case, the exhaust from the gas turbine (i.e., $CO_2 \cdot H_2O$) is subjected to heat recovery by a waste heat boiler. A steam turbine is driven by steam generated by the waste heat boiler to carry out power generation. Exhaust steam from the steam turbine is condensed and supplied as water to the waste heat boiler.

INDUSTRIAL APPLICABILITY

The present invention can be utilized in the industrial field of gasification equipment equipped with a gasification furnace for producing a gasification gas by the reaction between a carbonaceous fuel and $O_2$.

The invention claimed is:

1. Gasification equipment, comprising:
   $CO_2$ charging means for charging $CO_2$ from an outside into a gasification furnace for producing a gasification gas by a reaction between a carbonaceous fuel and $O_2$, wherein,
   the $CO_2$ charging means is i) a fuel transport means for transporting the carbonaceous fuel into the gasification furnace, and ii) a cooling means for charging $CO_2$ for cooling at an outlet of the gasification furnace, and
   the $CO_2$ charging means structured and arranged to adjust so that the $CO_2$ is charged into the gasification furnace at a first location together with the carbonaceous fuel transported by the fuel transport means, whereby an endothermic reaction for producing the gasification gas is accelerated, and is charged at a second location in an amount of $CO_2$ adjusted in accordance with a status of operation of the gasification furnace to control cooling from the endothermic reaction of the charged $CO_2$.

2. The gasification equipment according to claim 1, wherein the gasification furnace is an entrained flow coal gasification furnace which produces a coal gasification gas by a reaction between coal and $O_2$.

3. The gasification equipment according to claim 1, wherein the $CO_2$ charged by the $CO_2$ charging means is $CO_2$ recovered from a power generation plant equipped with a molten carbonate fuel cell from which $CO_2$ is recovered as an exhaust gas.

4. The gasification equipment according to claim 1, wherein the $CO_2$ charged by the $CO_2$ charging means is $CO_2$ recovered from gas turbine power generation equipment in which $CO_2$ is operated as an exhaust gas in a closed cycle.

5. Gasification equipment, comprising:
   a gasification furnace which produces a gasification gas by a reaction between coal and $O_2$,
   wherein the gasification equipment includes
   i) a gasification furnace into which $O_2$ is blown to burn coal to produce the gasification gas,
   ii) a molten carbonate fuel cell (MCFC 2) using the gasification gas obtained by the gasification furnace as an anode gas, and using $O_2$ and $CO_2$ as a cathode gas, the molten carbonate fuel cell (MCFC) discharging a $CO_2$ exhaust gas,
   iii) an expansion turbine (4, 5) operatively connected to receive and expand the $CO_2$ exhaust gas to generate electricity, the expansion turbine discharging a turbine exhaust gas,
   iv) a steam turbine (41) operatively connected to receive steam derived from heat (9) recovered from the turbine exhaust gas to generate further electricity,
   v) a $CO_2$ compressor (13) arranged to receive and compress a first portion of the $CO_2$ exhaust gas to provide a first compressed $CO_2$ exhaust gas circulated together with $O_2$ as the cathode gas to the molten carbonate fuel cell (MCFC), and
   vi) a recovered $CO_2$ compressor (25) arranged to receive and compress a second portion of the $CO_2$ exhaust gas to provide a second compressed $CO_2$ exhaust gas directed for transport of pulverized coal; and
   a $CO_2$ charging unit i) supplying the second compressed $CO_2$ exhaust gas and the pulverized coal into the gasification furnace, and ii) charging the second compressed $CO_2$ exhaust gas, as a quenching gas, into an outlet of the gasification furnace to lower a temperature of the resulting gas exiting the outlet of the gasification furnace sufficient to prevent deposition of ash,
   thereby the second compressed $CO_2$ exhaust gas is i) at a first location supplied into the gasification furnace to accelerate the formation of CO by an endothermic reaction between the coal and supplied second compressed $CO_2$ exhaust gas and ii) at a second location to lower the temperature of the resulting gas exiting the outlet of the gasification furnace sufficient to prevent deposition of ash.

UNITED STATES PATENT AND TRADEMARK OFFICE
CERTIFICATE OF CORRECTION

PATENT NO. : 8,480,766 B2  Page 1 of 1
APPLICATION NO. : 12/530344
DATED : July 9, 2013
INVENTOR(S) : Watanabe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this
Eighth Day of September, 2015

Michelle K. Lee
*Director of the United States Patent and Trademark Office*